United States Patent
Nakata et al.

(10) Patent No.: US 6,502,896 B1
(45) Date of Patent: Jan. 7, 2003

(54) BACKHOE

(75) Inventors: Yasuo Nakata, Osaka (JP); Yoshitaka Matsubara, Osaka (JP); Kenji Ikeda, Sakai (JP); Kenzo Koga, Izumi (JP); Teruo Kunizawa, Sakai (JP); Tomoaki Miyake, Sakai (JP)

(73) Assignee: Kubota Corporation (JP)

( * ) Notice: Subject to any disclaimer, the term of this patent is extended or adjusted under 35 U.S.C. 154(b) by 0 days.

(21) Appl. No.: 09/653,723

(22) Filed: Sep. 1, 2000

(30) Foreign Application Priority Data

Sep. 1, 1999 (JP) .......................... 11-247544
Sep. 16, 1999 (JP) .......................... 11-262392

(51) Int. Cl.$^7$ ............................................. B60R 27/00
(52) U.S. Cl. ............................ 296/190.05; 296/190.01; 296/190.06; 296/190.11; 296/147; 296/149; 180/89.12; 16/234; 16/382; 16/386; 16/387; 16/389
(58) Field of Search ..................... 296/190.01, 190.03, 296/190.04, 190.05, 190.06, 190.08, 190.11, 147, 149, 189; 180/89.12, 89.13; 16/234, 382, 386, 387, 389

(56) References Cited

U.S. PATENT DOCUMENTS

| | | | | |
|---|---|---|---|---|
| 480,238 A | * | 8/1892 | Ranker | 16/389 |
| 1,934,074 A | * | 11/1933 | Kubler | 16/387 |
| 2,207,046 A | * | 7/1940 | Anderson | 16/389 |
| 2,529,200 A | * | 11/1950 | Swanson | 414/690 |
| 4,035,016 A | * | 7/1977 | Ricca | 296/190.11 |
| 4,082,343 A | * | 4/1978 | Hurt, II et al. | 296/190.03 |
| 4,095,839 A | * | 6/1978 | Lawrence et al. | 296/190.03 |
| 4,907,667 A | * | 3/1990 | Yamamoto et al. | 180/89.13 |
| 5,016,721 A | * | 5/1991 | Yamamoto et al. | 180/89.13 |
| 5,491,875 A | * | 2/1996 | Siladke et al. | 16/346 |
| 5,842,735 A | * | 12/1998 | Makino et al. | 296/189 |
| 5,984,036 A | * | 11/1999 | Higuchi et al. | 180/89.12 |
| 6,155,632 A | * | 12/2000 | Fujimoto | 296/190.08 |

FOREIGN PATENT DOCUMENTS

| | | | |
|---|---|---|---|
| EP | 0311082 | 4/1989 | |
| EP | 0 773 339 A1 | * 5/1997 | 296/189 |
| EP | 1001094 | 5/2000 | |
| JP | 8291538 | 11/1996 | |
| JP | 11100864 | 4/1999 | |

* cited by examiner

*Primary Examiner*—Glenn Dayoan
*Assistant Examiner*—Lori L Coletta
(74) *Attorney, Agent, or Firm*—Webb Ziesenheim Logsdon Orkin & Hanson, P.C.

(57) ABSTRACT

A backhoe (1) includes an upper structure (3) supported by a traveling device (2) to be rotatable about a vertical swivel axis (X). The upper structure (3) carries an excavator (4) and a cab (12) and has a rear edge (3A) formed arcuate about the swivel axis (X) in plan view. The cab (12) defines an opening (31) with a door (32) attached through hinges (34). The door (32) is pivotable about a vertical open/close axis (Y) of hinges (34). The hinges (34) are arranged on a rear edge opening (31). Each hinge (34) includes a pair of hinges (34A and 34B) which are bent to place the axis (Y) forwardly of the rear end of door (32). Consequently, when the door (32) is set to a fully open position, the free end of door (32) is displaced to a position forwardly of the rear edge (3A) of upper structure (3).

18 Claims, 6 Drawing Sheets

BACKHOE

BACKGROUND OF THE INVENTION

1. Field of the Invention

This invention relates to a backhoe with an upper structure mounted on a traveling device through a bearing to be rotatable about a vertical axis, the upper structure supporting a cab having a side entrance opening with a door which swings open and close about a vertical pivotal axis.

2. Description of the Related Art

Attempts have been made to restrict such a door protruding from the cab, as disclosed in Japanese Patent Laying-Open Publication H8-291538 and Patent Laying-Open Publication H11-100864, for example. In the prior art disclosed in the former, an opening formed laterally of a cab has a door (entrance door) curved to follow a lateral profile of the cab and supported to be slidable in the fore and aft direction along the outer surface of the cab. The opening is opened by sliding the door rearward without protruding the door from the cab. In the prior art disclosed in the latter publication, a first door panel and a second door panel are interconnected to be pivotable relative to each other, and each panel is biased by a gas damper. When the door is opened, the first and second door panels follow the outer surface of the cab and protrude only a small amount from the outer surface.

Take a small swivel type backhoe for example, such a backhoe includes an upper structure designed such that, when rotated, its rear end does not protrude from the width of right and left crawlers. Consequently, when this type of backhoe is moved into a back alley to engage in an operation, for example, the upper structure is kept out of contact with objects such as a utility pole and part of a building present close to the right or left crawler. Where the cab on the upper structure has a door, the backhoe is designed on the assumption that the upper structure is rotated with the door closed. Thus, when the door is opened to a limit of its swinging movement (hereinafter referred to as a fully open position), the rear end of the door protrudes rearwardly from the upper structure. When the upper structure is rotated in this state, the end of the door could contact a utility pole or eaves of a house.

It is conceivable to eliminate the inconvenience of the free end of the opened door (which is at the forward end of the cab when closed) protruding rearwardly of the upper structure, by providing the door constructions disclosed in the two prior publications noted above. However, each of these prior constructions has a large number of parts, and is complicated, tending to increase cost. In addition, each of the prior constructions includes numerous actuating parts. There is room for improvement in that malfunctioning could easily occur.

SUMMARY OF THE INVENTION

The object of this invention is to provide an improved backhoe in which the free end of a door in a fully opened position does not protrude from the rear end of an upper structure.

The above object is fulfilled, according to this invention, by a backhoe as noted hereinbefore wherein an open/close axis of hinges is disposed in a rearward position of the opening and forwardly of a rear end of the door, and the door is swung about the open/close axis by moving a front end of the door outwardly of the cab.

In the above feature, the open/close axis is disposed forwardly of the rear end of the door in the closed position. Compared with a construction having the open/close axis disposed at or rearwardly of the rear end of the door in the closed position, the free end of the door (i.e. the front end of the door in the closed position) may be displaced forwardly when the door is placed in the fully open position. Further, this feature realizes a simple support structure for allowing the door to swing open and close about the open/close axis. There is no need to employ a complicated structure as discussed hereinbefore in relation to the prior art. Thus, an improved backhoe is provided, which has a reduced chance of malfunctioning, avoids cost increases, and avoids the inconvenience of the door protruding rearward from the rear end of the upper structure.

In an embodiment of this invention, the door has a front end in the closed position directed rearwardly of the cab when the door is in the fully open position, the front end of the door being contained in a region of rotation described by the upper structure rotating about the swivel axis.

In the above feature, the front end of the door is contained in the region of rotation of the upper structure even when the door is set to the fully open position. The door will not contact a utility pole or part of a house even when the upper structure is rotated with the door set to the fully open position. As a result, when the backhoe engages in an operation with the door set to the fully open position, smooth swivels may be made without damaging the door, utility pole and so on.

In the embodiment of this invention, each of the hinges includes a leaf connected to the opening, a leaf connected to the door, and a pin for interconnecting the leaves to be pivotable relative to each other about the axis, the leaves being bent to place the pin forwardly of the rear end of the door.

With the above feature, the simple improvement consisting in bending the leaves constituting each hinge not only places the open/close axis of the door forwardly of the rear end of the door, but requires little improvement to be made in the cab or door. As a result, the construction is easy to manufacture and a further cost reduction is achieved.

In the embodiment of this invention, the upper structure or the cab defines a recess opposed to the door and receiving part of the door when the door is set to the fully open position.

The above feature allows the door in the fully open position to lie along the upper structure or cab, with part of the door entering the recess in the upper structure or cab. Compared with a construction having no such recess, the door may be swung to a large extent. This increases the effect of avoiding the inconvenience of the door protruding from the upper structure or cab.

Other features and advantages of this invention will be apparent from the following description of the embodiments to be taken with reference to the drawings.

DESCRIPTION OF THE PREFERRED EMBODIMENTS

Figure 1:
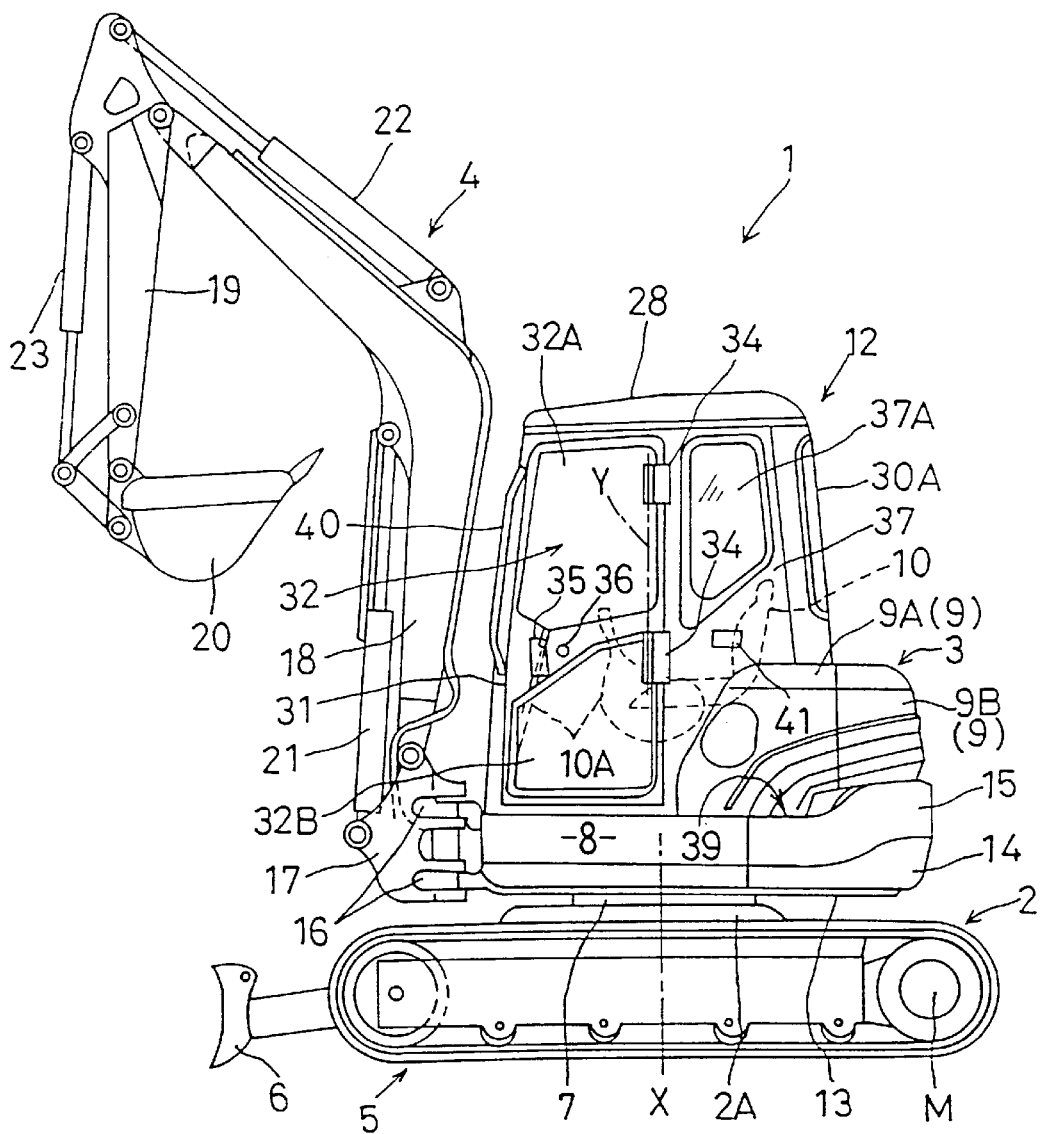
FIG. 1 is a side view of a backhoe according to this invention.
Figure 2:
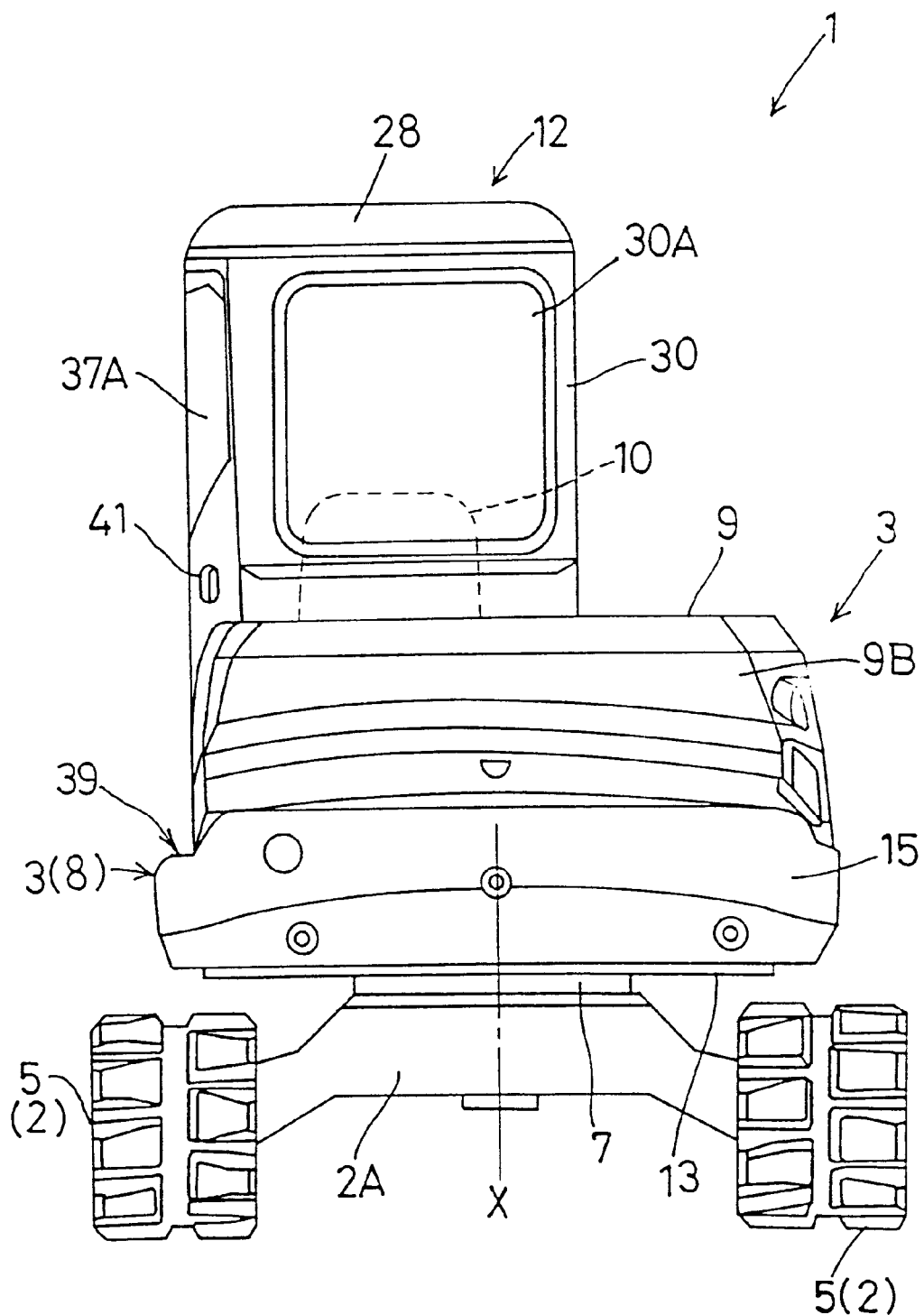
FIG. 2 is a rear view of the backhoe.
Figure 3:
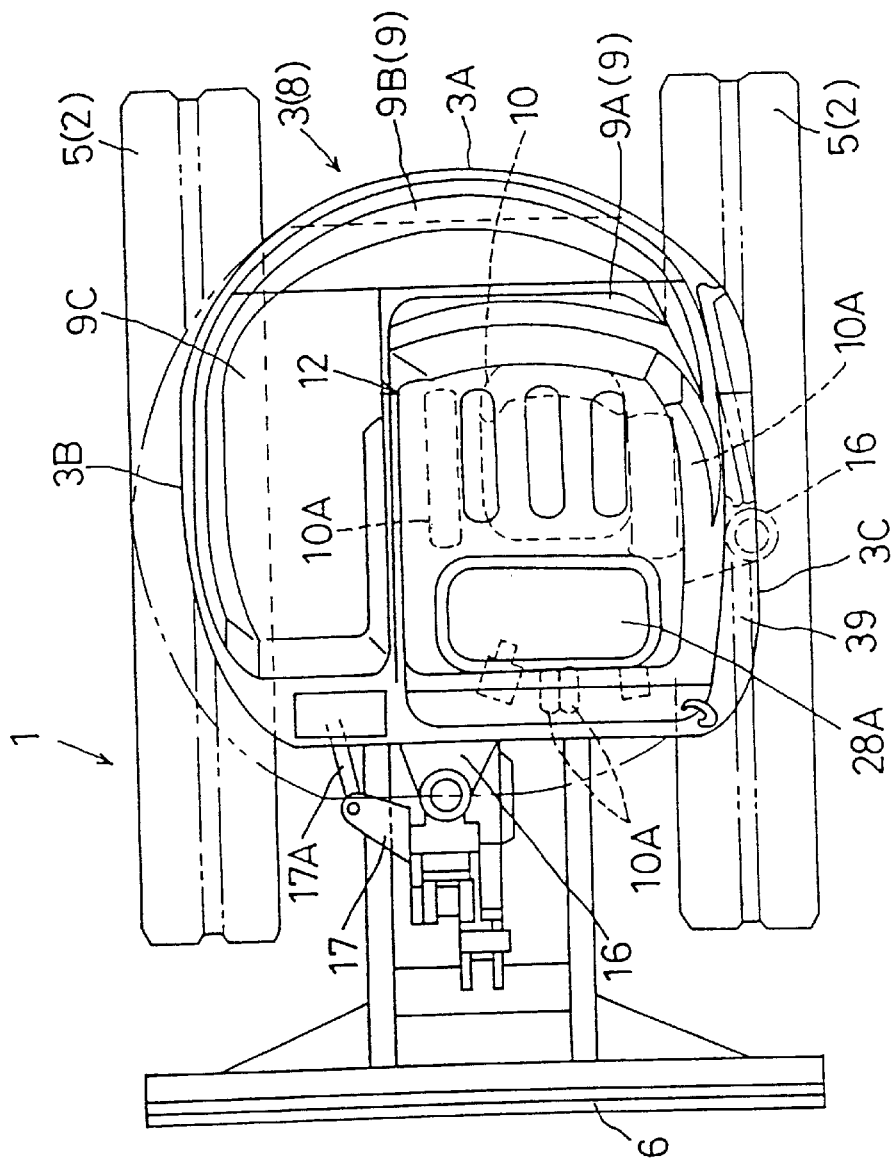
FIG. 3 is a plan view of the backhoe.

As shown in FIGS. 1 through 3, a backhoe 1 includes a traveling device 2, an upper structure 3 and an excavator 4.

With this backhoe 1, the traveling direction (sideways in FIG. 1) is called the longitudinal direction, while the direction perpendicular thereto (direction at right angles to the plane of FIG. 1) is called the transverse direction.

The traveling device 2 includes right and left crawler tracks 5 formed of rubber belts, and a propelling motor M for driving the right and left crawler tracks 5. Forwardly of the right and left crawler tracks 5 is a bulldozer blade G vertically movably attached to a track frame 2A.

The upper structure 3 includes a rotating frame 8, a hood 9 and a cab 12. The rotating frame 8 is supported by a bearing (swivel bearing) 7 disposed in a middle position on the track frame 2A between the right and left crawler tracks 5 of traveling device 2, to be rotatable about a swivel axis X of the bearing 7. The hood 9 covers various devices (an engine, a radiator and a tank) mounted on the rotating frame 8. The cab 12 covers a seat 10 mounted on the hood 9, and a control section 10A adjacent the seat 10.

The hood 9 includes a fixed hood 9A, an openable rear hood 9B hinged to a rear end of fixed hood 9A, and a full open type side hood 9C covering the tank and a battery at the right side of cab 12. The seat 10 is supported substantially on the fixed hood 9A.

The rotating frame 8 includes a base plate 13 with a mounting bracket erected thereon for supporting the various devices, and a cover 14 formed of FRP or steel plate and extending circumferentially of the base plate 13. A counter weight 15 is disposed in a rear position of the base plate 13 to balance the weight of the excavator 4 connected to the front of the rotating frame 8. The rotating frame 8 is rotatable about the swivel axis X by a swivel motor (not shown) disposed on the base plate 13.

The upper structure 3 has a rear edge 3A formed arcuate about the swivel axis X in plan view, so that the rear edge 3A is contained in a width between outer ends transversely of right and left crawler tracks 5 when the upper structure 3 rotates about the swivel axis X. Further, the right edge 3B and left edge 3C of the upper structure 3 (rotating frame 8) extend straight in the longitudinal direction in plan view. That is, this backhoe 1 is a working vehicle called the rear small turn type, in which the rear edge 3A of upper structure 3 describes a turning locus, when the upper structure 3 rotates, which is contained in the width between the outer ends transversely of right and left crawler tracks 5.

As shown in FIGS. 1 and 2, the rotating frame 8 has a pair of upper and lower pivotal supports 16 projecting forward from the front surface thereof for supporting the excavator 4. A swing bracket 17 is connected to the pivotal supports 16 through a vertical axis to be pivotable right and left. The swing bracket 17 is pivotable by a swing cylinder 17A mounted in the rotating frame 8.

The excavator 4 includes a boom 18 supported at a proximal end thereof by the swing bracket 17 to be pivotable about a transverse axis, an arm 19 connected to a distal end of the boom 18 to be pivotable about a transverse axis, and a bucket 20 connected to a distal end of the arm 19 to be pivotable about a transverse axis. The boom 18 is driven by a boom cylinder 21 disposed between the swing bracket 17 and boom 18. The arm 19 is driven by an arm cylinder 22 disposed between an intermediate portion of boom 18 and the arm 19. The bucket 20 is driven by a bucket cylinder 23 disposed between a distal end of arm 19 and mounting links of bucket 20.

Figure 4:
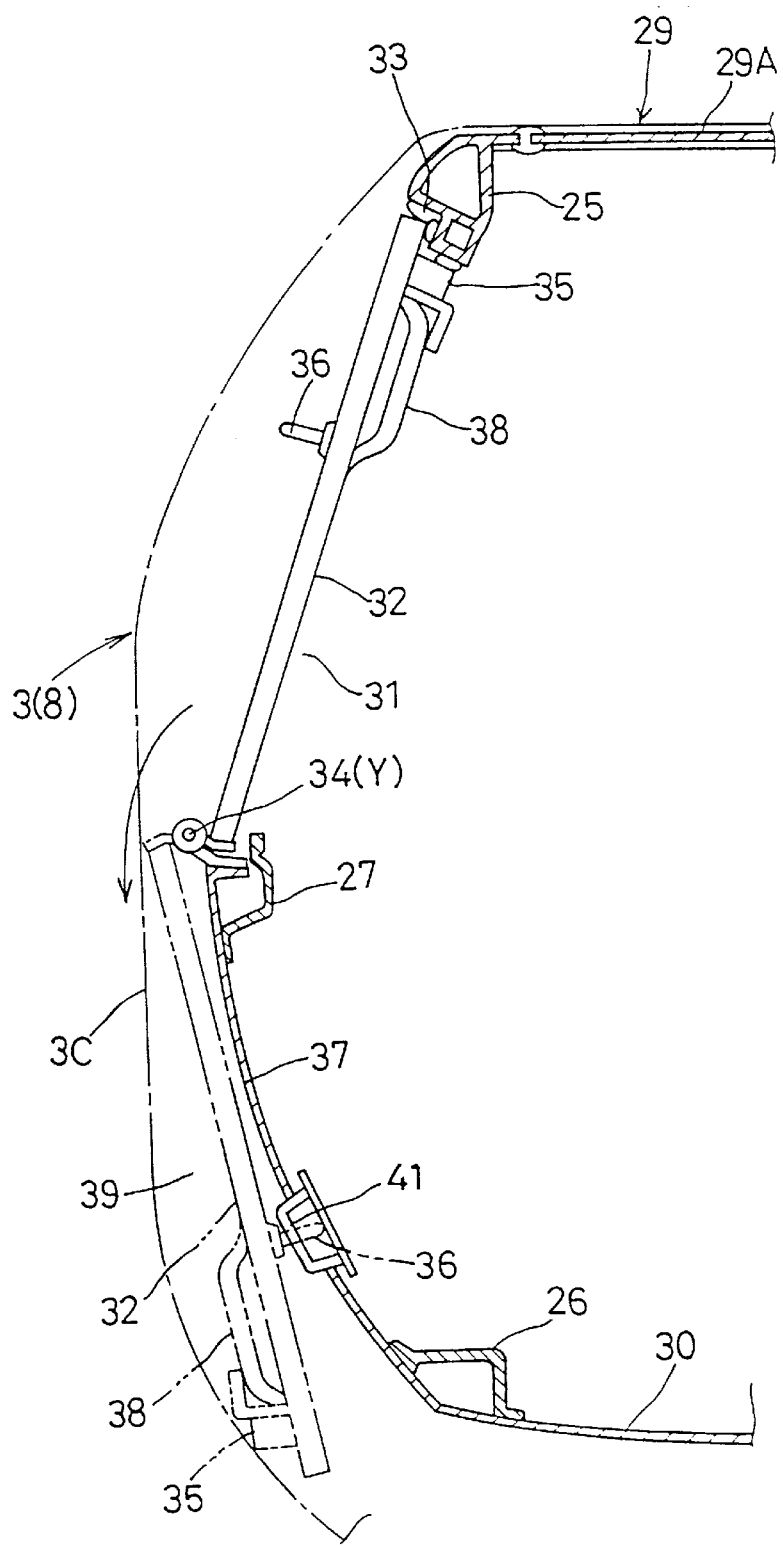
FIG. 4 is a plan view showing an open/close structure of a door.

As shown in FIGS. 1 and 4, the cab 12 includes a cab frame having right and left front posts 25 erected in forward end positions of the rotating frame 8, right and left rear posts 26 erected on an upper surface of fixed hood 9A, right and left intermediate posts 27 erected in intermediate positions in the longitudinal direction of the rotating frame 8, and an upper frame (not shown) interconnecting upper ends of these posts. The upper frame of the cab frame supports a top board 28. The right and left front posts 25 have a front panel 2.9 attached therebetween and including front windows 29A. The right and left rear posts 26 have a rear panel 30 attached therebetween and including a rear window 30A.

The cab 12 has an opening 31 formed in a front position on the left side thereof for allowing the operator to board and alight from the backhoe, and a swing door 32 is provided for opening and closing this opening 31. The opening 31 is formed in a rectangular frame shape by the front post 25, intermediate post 27 and the upper frame disposed above. Rubber seals 33 extend along inner peripheries of the opening frame for sealing the door 32. The door 32 has upper and lower door panels for holding door windows 32A and 32B.

Figure 5:
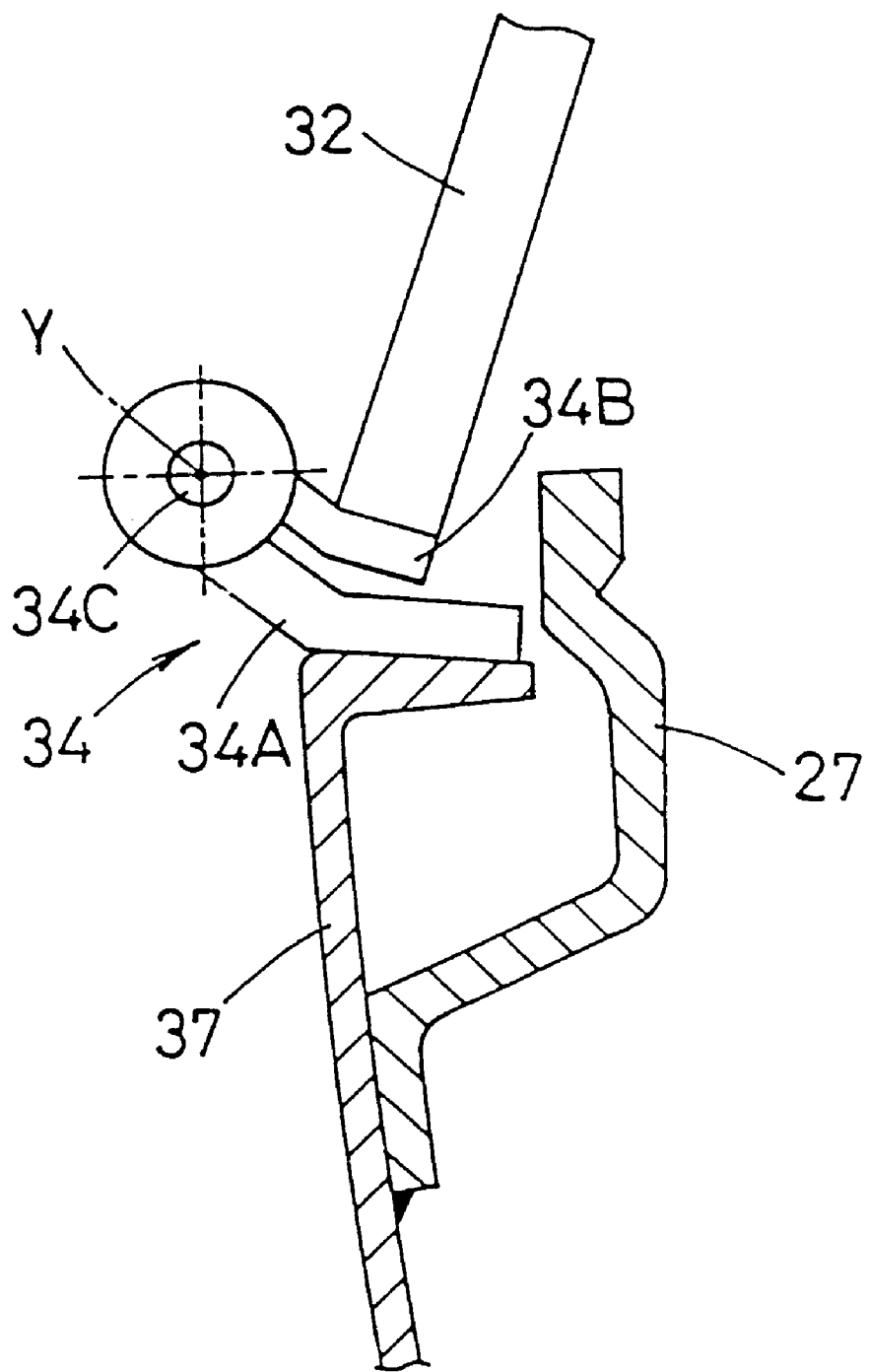
FIG. 5 is a sectional view of a hinge.

As shown in FIGS. 1, 4 and 5, hinges 34 are arranged on the cab at the rear end of opening 31. The hinges 34 have a pivotal axis Y disposed forwardly of the rear end of door 32. Specifically, each hinge 34 includes a leaf 34A connected to an edge of opening 31 by bolts, a leaf 34B connected to the rear end of door 32 by bolts, and a pin 34C for interconnecting the leaves 34A and 34B to be pivotable relative to each other about the pivotal axis Y The leaves 34A and 34B are bent whereby the pin 34C is disposed forwardly of the rear end of door 32.

A door lock 35 is provided at a vertically intermediate position at the forward end of the door 32 in the closed position. A lock element 36 is provided in a forward position on an outer surface of the door 32 in the closed position. A side panel 37 having a side window 37A is disposed between the intermediate post 27 and rear post 26. The side panel 37 has a locking device 41 for engaging the lock element 36 when the door 32 is set to a fully open position to lie along the side panel 37 as shown in phantom lines in FIG. 4, thereby to hold the door 32 in the fully open position. Further, the door 32 has a handrail 38 attached to an inner surface thereof to assist opening and closing of the door 32.

The outer surface (i.e. left surface) of cab 12 where the opening 31 is formed is displaced inwardly of the rotating frame 8 by an amount corresponding to the thickness of door 32. In addition, the rotating frame 8 (upper structure 3) defines a recess 39 for receiving, without contacting, part of the door 32 set to the fully open position. This recess 39 extends from a rearward position of rotating frame 8 to side surfaces of counter weight 15 and rear hood 9B continuous upward from the rearward position.

With the above construction, when opening the door 32 from the closed position, the forward end of door 32 is moved outward to swing the door 32 about the pivotal axis Y to the fully open position. Then, the lock element 36 engages the locking device 41 to maintain the door 32 in the fully open position. In the fully open position, the forward end of door 32 in the closed position is directed rearwardly of the cab and enters the recess 39, so that the entire door 32 is contained, in plan view, inside the outer edge of rotating frame 8. As a result, when the door 32 reaches the fully open position, the forward end of door 32 in the closed position does not protrude rearward from the rear edge of rotating frame 8. This end of door 32 is contained in a region of rotation of rotating frame 8 after swinging about the pivotal axis Y The door 32 will not contact a utility pole or the like when the upper structure 3 is rotated about the swivel axis X.

Figure 6:
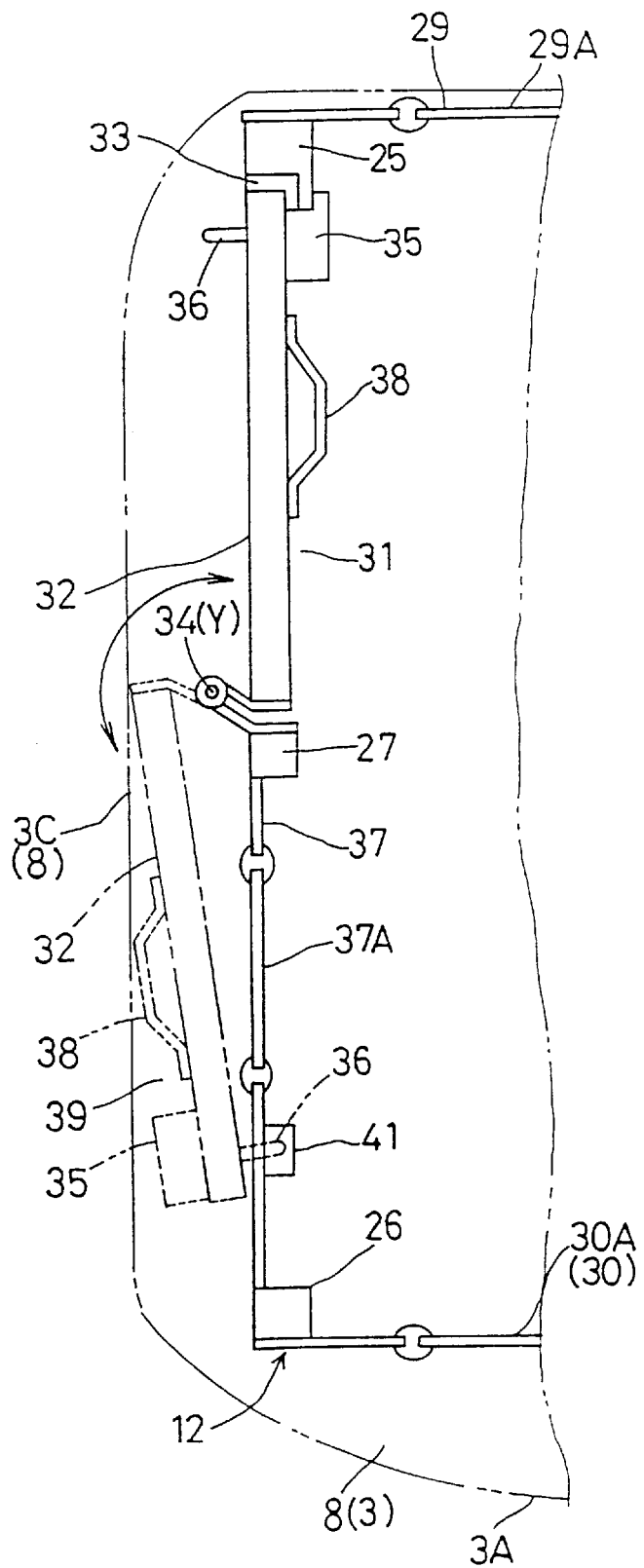
FIG. 6 is a plan view showing an open/close structure of a door in another embodiment.

FIG. 6 shows a cab 12 and a door 32 in another embodiment of the invention. Right and left front posts 25, right and left intermediate posts 27 and right and left rear posts 26 arranged on straight lines in the longitudinal direction. The cab 12 has a left surface in a vertical plane. The cab 12 is formed square with a front panel 29, a rear panel 30 and side panels 37. The door 32 is disposed in the same plane as the side panel 37. Compared with the construction shown in FIG. 4, this construction has the intermediate posts 27 disposed inwardly of the cab 12. Although the cab 12 has a reduced space, the door 32, front panel 29, rear panel 30 and side panels 37 are simplified in construction, resulting in an advantage in manufacturing cost.

As shown in FIGS. 2 and 3, a skylight 28A, preferably an open/close skylight 28A of the sunroof type, is formed in a position visible from the seat 10. In addition, the front and rear windows may have wipers. The front post 25 adjacent the door 32 has a handrail 40 for use in boarding and alighting from the backhoe.

What is claim is:

1. A working vehicle comprising:
    a base;
    an upper structure rotatable about a vertical swivel axis supported on said base; and
    a cab supported on said upper structure, said cab including:
        a frame defining an entrance opening in a lateral side of said cab;
        a door attached to said frame, said door being movable between a fully opened position and a closed position for opening and closing said entrance opening, respectively; and
        at least one hinge defining a substantially vertical pivot axis for pivotably attaching said door to said frame so that said door is movable between said fully opened position and said closed position,
        wherein said at least one hinge includes a first leaf connected to said frame, a second leaf connected to said door, and a pin for interconnecting said first and second leaves to be pivotable relative to each other about said vertical pivot axis, said vertical pivot axis being positioned forwardly of said first and second leaves when the door is in said closed position, and wherein said upper structure or said cab defines a recess opposed to said door and receiving part of said door when said door is set to said fully open position.

2. A working vehicle as defined in claim 1, wherein said door has a front end directed rearwardly of the cab when said door is in said fully open position, said front end of the door in said fully opened position being contained in a region of rotation described by said upper structure rotating about said swivel axis.

3. A working vehicle as defined in claim 2, wherein a plurality of hinges attaches said door to said cab.

4. A working vehicle as defined in claim 3, wherein said first and second leaves being bent to place said pin forwardly of the rear end of said door.

5. A working vehicle as defined in claim 4, further including a locking device on said cab engaging a part of said door retaining said door in said fully open position.

6. A working vehicle as defined in claim 1, wherein said opening is displaced inwardly of a region of rotation of said upper member by at least the thickness of said door.

7. A working vehicle comprising:
    a base;
    an upper structure rotatable about a vertical swivel axis supported on said base; and
    a cab supported on said upper structure, said cab including:
        a frame defining an entrance opening in a lateral side of said cab;
        a door attached to said frame, said door being movable between a fully opened position and a closed position for opening and closing said entrance opening, respectively, wherein said door has its forward and rear ends substantially inscribe an outer contour of said upper structure in plan view when said door is in said fully opened position; and
        at least one hinge defining a substantially vertical pivot axis for pivotably attaching said door to said frame so that said door is movable between said fully opened position and said closed position, wherein said upper structure or said cab defines a recess opposed to said door and receiving part of said door when said door is set to said fully open position.

8. A working vehicle as defined in claim 7, wherein said door has a front end directed rearwardly of the cab when said door is in said fully opened position, said front end of the door in said fully opened position being contained in a region of rotation described by said upper structure rotating about said swivel axis.

9. A working vehicle as defined in claim 8, wherein a plurality of hinges attaches said door to said cab.

10. A working vehicle as defined in claim 9, wherein each said hinge includes a first leaf connected to said frame, a second leaf connected to said door, and a pin for interconnecting said first and second leaves to be pivotable relative to each other about said vertical pivot axis, said first and second leaves being bent to place said pin forwardly of the rear end of said door.

11. A working vehicle as defined in claim 10, further including a locking device on said cab engaging a part of said door retaining said door in said fully open position.

12. A working vehicle as defined in claim 7, wherein said opening is displaced inwardly of a region of rotation of said upper member by at least the thickness of said door.

13. A working vehicle comprising:
    a base;
    an upper structure rotatable about a vertical swivel axis supported on said base; and
    a cab supported on said upper structure, said cab including:
        a frame defining an entrance opening in a lateral side of said cab;
        a door attached to said frame, said door being movable between a fully opened position and a closed position for opening and closing said entrance opening, respectively, wherein said door has its forward and rear ends substantially inscribe an outer contour of said upper structure in plan view when said door is in said fully open ended position; and
        at least one hinge defining a substantially vertical pivot axis for pivotably attaching said door to said frame so that said door is movable between said fully opened position and said closed position;
        wherein said at least one hinge includes a first leaf connected to said frame, a second leaf connected to said door, and a pin for interconnecting said first and second leaves to be pivotable relative to each other about said vertical, said vertical pivot axis being positioned forwardly of said first and second leaves when the door is in said closed position, wherein said upper structure or said cab defines a recess opposed to said door and receiving part of said door when said door is set to said fully open position.

14. A working vehicle as defined in claim 13, wherein said door has a front end directed rearwardly of the cab when said door is in said fully opened position, said front end of the door in said fully opened position being contained in a region of rotation described by said upper structure rotating about said swivel axis.

15. A working vehicle as defined in claim 14, wherein a plurality of hinges attaches said door to said cab.

16. A working vehicle as defined in claim 15, wherein said first and second leaves being bent to place said pin forwardly of the rear end of said door.

17. A working vehicle as defined in claim 16, further including a locking device on said cab engaging a part of said door retaining said door in said fully open position.

18. A working vehicle as defined in claim 13, wherein said opening is displaced inwardly of a region of rotation of said upper member by at least the thickness of said door.

* * * * *

UNITED STATES PATENT AND TRADEMARK OFFICE
CERTIFICATE OF CORRECTION

PATENT NO.    : 6,502,896 B1
DATED         : January 7, 2003
INVENTOR(S)   : Yasuo Nakata et al.

It is certified that error appears in the above-identified patent and that said Letters Patent is hereby corrected as shown below:

Column 4,
Line 6, "front panel 2.9" should read -- front panel 29 --.
Lines 27 and 65, after "axis Y" insert period -- . --.

Column 6,
Line 60, "about said vertical," should read -- about said vertical pivot axis, --.

Signed and Sealed this

Twenty-ninth Day of July, 2003

JAMES E. ROGAN
*Director of the United States Patent and Trademark Office*